(12) United States Patent
Neale et al.

(10) Patent No.: US 9,339,895 B2
(45) Date of Patent: May 17, 2016

(54) UNIVERSAL RETROFIT KIT APPARATUS AND METHODS THEREOF

(71) Applicants:Anne E. Neale, Deerfield, IL (US);
Zachary P. Scott, Prairie View, IL (US);
Ronald K. Worth, Deerfield, IL (US)

(72) Inventors: Anne E. Neale, Deerfield, IL (US);
Zachary P. Scott, Prairie View, IL (US);
Ronald K. Worth, Deerfield, IL (US)

( * ) Notice: Subject to any disclaimer, the term of this patent is extended or adjusted under 35 U.S.C. 154(b) by 0 days.

(21) Appl. No.: 13/919,823

(22) Filed: Jun. 17, 2013

(65) Prior Publication Data

US 2013/0340550 A1 Dec. 26, 2013

Related U.S. Application Data

(60) Provisional application No. 61/660,362, filed on Jun. 15, 2012.

(51) Int. Cl.
| *F16H 3/06* | (2006.01) |
| *F16H 27/02* | (2006.01) |
| *F16H 29/02* | (2006.01) |
| *F16H 29/20* | (2006.01) |
| *B23P 6/00* | (2006.01) |
| *B23Q 5/40* | (2006.01) |
| *F16H 25/22* | (2006.01) |

(52) U.S. Cl.
CPC ... *B23P 6/00* (2013.01); *B23Q 5/40* (2013.01); *F16H 25/2204* (2013.01); *Y10T 29/49716* (2015.01); *Y10T 74/18576* (2015.01)

(58) Field of Classification Search
CPC .. G05B 2219/50168; B23P 6/00; B23Q 5/40; F16H 25/2204
USPC ........ 74/89.23, 89.42, 89.45, 424.71, 424.72, 74/424.75, 441; 29/401.1; 173/2, 13, 191; 409/210; 384/59, 95, 562; 464/162, 464/168
See application file for complete search history.

(56) References Cited

U.S. PATENT DOCUMENTS

| 697,332 | A | * | 4/1902 | Doney | 74/441 |
|---|---|---|---|---|---|
| 2,801,888 | A | * | 8/1957 | Najmowski | 384/59 |
| 3,859,001 | A | * | 1/1975 | Hoddinott et al. | 408/3 |
| 4,564,993 | A | * | 1/1986 | Blaurock et al. | 29/434 |
| 4,677,869 | A | * | 7/1987 | Mayfield | 74/424.83 |
| 5,000,416 | A | * | 3/1991 | Fantasia | 248/650 |
| 5,036,720 | A | * | 8/1991 | Shirasawa et al. | 74/441 |
| 5,195,853 | A | * | 3/1993 | Dooley | 408/137 |
| 5,330,298 | A | * | 7/1994 | Welch et al. | 409/80 |
| 6,095,728 | A | * | 8/2000 | Howie | 409/214 |
| 6,116,107 | A | * | 9/2000 | Kafai | 74/424.71 |

(Continued)

OTHER PUBLICATIONS

"Universal Benchtop Retrofit Kit Breaks CNC Price Barriers", Dec. 1, 2009, Search Consulting Services.*

(Continued)

*Primary Examiner* — William Kelleher
*Assistant Examiner* — Jake Cook
(74) *Attorney, Agent, or Firm* — Jeffrey A. Pine; Dykema Gossett PLLC

(57) ABSTRACT

A system and method for retrofitting a manual benchtop milling machine utilizing servo controls and/or stepper motors, in which a retrofit kit and method for the modification of a milling machine incorporates ball screws and ball nuts, without removing or replacing the original acme nuts, which have been properly configured and aligned to the machine on which they were originally installed. The retrofit kit and method allow for the modification using the alignment of the original acme nuts in their proper location and alignment obviating the need for custom machining or alignment.

7 Claims, 12 Drawing Sheets

52R

(56) References Cited

U.S. PATENT DOCUMENTS

| | | | |
|---|---|---|---|
| 6,321,614 B1 * | 11/2001 | Blaurock et al. | 74/441 |
| 6,357,975 B1 * | 3/2002 | Elrod et al. | 409/80 |
| 6,488,453 B2 * | 12/2002 | Elrod et al. | 409/80 |
| 7,458,292 B2 * | 12/2008 | Scholz | 74/424.72 |
| 2003/0167867 A1 * | 9/2003 | Lange et al. | 74/89.37 |
| 2007/0170007 A1 * | 7/2007 | Kuo | 187/267 |

OTHER PUBLICATIONS

"Universal Retrofit Kit", Mar. 20, 2012, www.flashcutcnc.com, Manual Revision I.*

* cited by examiner

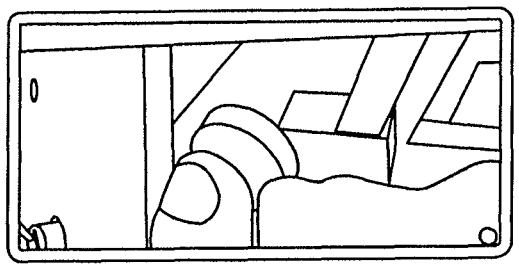
FIG. 10
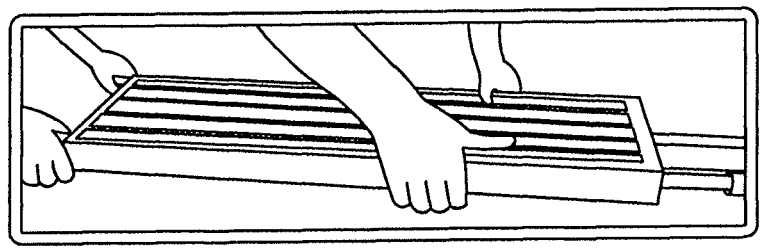
FIG. 11
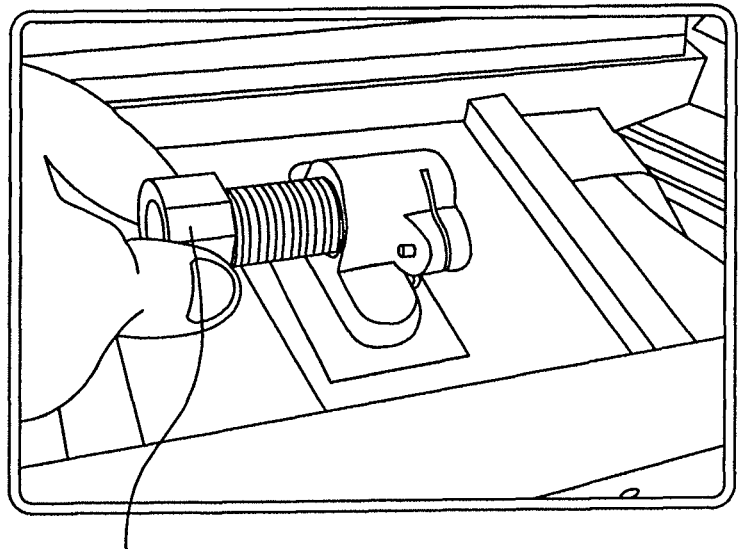
52R    FIG. 12

UNIVERSAL RETROFIT KIT APPARATUS AND METHODS THEREOF

PRIORITY STATEMENT

This application claims the benefit of U.S. Provisional Application No. 61/660,362, filed Jun. 15, 2012.

FIELD OF THE INVENTION

The present disclosure relates to a retrofit kit, and in particular, the present disclosure relates to a retrofit kit for a benchtop milling machine utilizing servo or stepper controls. The present disclosure provides for a retrofit kit that allows for the modification of a milling machine and adding ball screws and ball nuts without replacing the original acme nuts, which inherently have been properly configured and aligned to the machine they were originally installed on. If the ball nut completely replaced the original acme nut, then custom machining and difficult alignment would be necessary. The retrofit kit of the present disclosure uses the alignment of the original acme nuts and there is no need for custom machining or alignment.

BACKGROUND OF THE INVENTION

Milling machines have been around for a long time, and are used to machine solid materials such as wood or metal. Milling machines can perform numerous operations, from simple cutting, such as slot and keyway cutting, planing or drilling, to more complex functions, such as contouring and die sinking. Quite often, fluid is sprayed or pumped to the material being cut to cool and lubricate the cutting device and to wash away the material being cut away. Milling machines range in size from small, bench-mounted devices to room-sized machines.

Milling machines may be operated manually, mechanically automated, or digitally automated using computer numeric control. As such, depending on the type of operation, the movement of the material and the cutter can be precisely controlled to less than 0.001 in (0.025 mm).

Milling machines are often classed in two basic types, horizontal and vertical, referring to the orientation of the main shaft of the machine. Whereas a drill press holds the material to be cut or drilled stationary in relation to the drill, milling machines may move the material in relation to the cutting device. Thus, the cutting device can cut the material from its side as well as the tip.

For vertical milling machines, the shaft or axis is vertically oriented and the cutter is held in the spindle and rotates on its axis. The spindle can generally be extended or the table can be moved, obtaining the same result. Generally, the vertical milling machines can be a bed mill or a turret mill. The turret mill has a stationary spindle and the table can be moved perpendicular and parallel during the milling or cutting. The bed mill, on the other hand, only provides for a perpendicular movement in relation to the spindle, while the spindle moves parallel to its own axis.

A mill-drill is another milling machine, which is usually smaller in size. The mill-drill is similar to a small drill press but equipped with an X-Y table.

A horizontal mill has a similar x-y table, but the cutters are mounted horizontally across the table. Horizontal mills can also include a built-in rotary table that allows milling at various angles. While the tools available to a vertical mill may be used in a horizontal mill, horizontal mills can also use arbor-mounted cutters, such as side and face mills. These cutters have a cross section similar to a circular saw, but are generally wider and smaller in diameter. Since the cutters have good support from the arbor and a larger cross-sectional area, heavier cuts can be taken speeding up the removal of material.

Further, in order to automatically control a milling machine (as opposed to manual control), a milling machine can be connected to and controlled by a Computer Numeric Control or CNC system. The CNC system provides for precise and/or repetitive control of the machine. Most CNC milling machines are computer controlled vertical mills with the ability to move the spindle vertically along the Z-axis. This extra degree of freedom permits their use in die sinking, engraving applications, milling sculptures, etc. Milling precision can also be improved when CNC is combined with certain cutting tools, such as conical or ball nose cutters.

A retrofit kit can be used to convert a manual milling machine to an automatic milling machine, however one drawback occurs when the original acme nut is removed in order to replace with ball screws and nuts. The original acme nuts are preconfigured and aligned by the manufacturer for each specific machine. A complete ball nut replacement would need to have the same configuration and alignment which would require custom machining and tedious alignment for each machine.

As such, there currently exists a need for a retrofit kit that can simply and quickly retrofit a milling or drilling machine into a CNC milling machine that can be computer controlled for more precise milling and drilling operations, without removing the original acme nut.

SUMMARY OF THE INVENTION

The present disclosure is a universal retrofit kit that allows the modification of a milling machine to a CNC milling machine that can be driven through a computer based control system, such as that sold by FlashCut CNC, Inc. for Windows® 7 and 8, Vista, and/or XP among other operating systems, using intuitive controls and real time graphics. Once the retrofit kit is installed on a milling machine, such as for example the G1006 2 HP Mill/Drill manufactured and sold by Grizzly Industrial, Inc., the modified milling machine retrofit kit will allow for the computer controlled production of parts and prototypes quickly and accurately. Other types of milling machine that can be modified include those from manufacturers such as MSC, Busy Bee, Enco, Rong Fu and Jet.

An object of the present disclosure is to provide a universal retrofit or modification kit which provides for the modification of a milling machine to a CNC milling machine.

Another object of the present disclosure is to provide a retrofit kit that allows for a modification to a milling machine using ball screws and nuts, and replacing the original acme screws without replacing the original acme nuts, which inherently have been properly configured and aligned to the machine they were originally installed on. If the ball nut completely replaced the original acme nut, then custom machining and difficult alignment would be necessary. The original acme nut, which is maintained, is used as a reference location for securing the new ball screw and nut. The retrofit kit of the present disclosure thus allows for the modification of the machine with the original acme nut remaining in its proper location and using the original alignment.

Other objects and advantages of the present disclosure will become apparent to one having ordinary skill in the art after reading the specification in light of the drawing figures, however, the spirit and scope of the present disclosure should not be limited to the description of the embodiments contained herein.

BRIEF DESCRIPTION OF THE DRAWINGS

The preferred embodiments of the disclosure will be described in conjunction with the appended drawings provided to illustrate and not to limit the disclosure, where like designations denote like elements, and in which:

FIGS. 5 through 23B illustrate the instructions and operation for the milling machine retrofit in accordance with the present disclosure.

DETAILED DESCRIPTION OF EMBODIMENTS OF THE INVENTION

The present disclosure is a universal retrofit kit 10 that allows for the modification of a milling machine into a CNC milling machine that can be driven through a computer based control system using intuitive controls and real time graphics. Once converted, the CNC milling machine will be computer controlled and provide for more precision work along with easily performing repetitive steps without fail.

There are a number of different type of milling machines that can be modified, including for example, one or more of the milling machines manufactured by Grizzly, such as model numbers G1006 2 HP Mill/Drill, G3358 Mill Drill, G0519 Mill/Drill/Tapping Machine, G0705, and G3358 Mill Drill among others. Other manufacturers and machines include the Enco W/105-1117 10" 1 HP Square Column Geared HD Mill Drill, the Rong Fu RF31 1.5 HP Mill Drill, and Rong Fu RF 45 21" 1 HP 220V gear head Mill/Drill (along with any Rong Fu clones); and the Jet JMD-18, R-8 Taper, 2 HP and JMD-15, R-8 Taper, 1 HP. Almost all types and models can be retrofitted or modified as generally described herein. The disclosure herein pertains to other sized mills such as a large Bridgeport milling machine or a small X3 mini-mill, among others. It also pertains to lathes and other machines where traditional lead screws are being replaced by ball screws.

Figure 1:
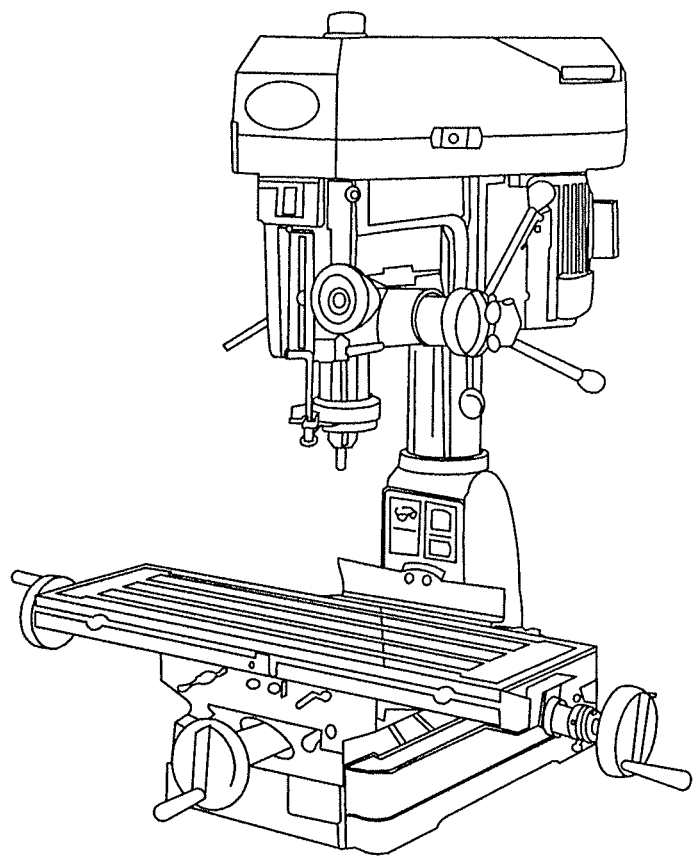
FIG. 1 illustrates a milling machine prior to being modified in accordance to the present disclosure.
Figure 2:
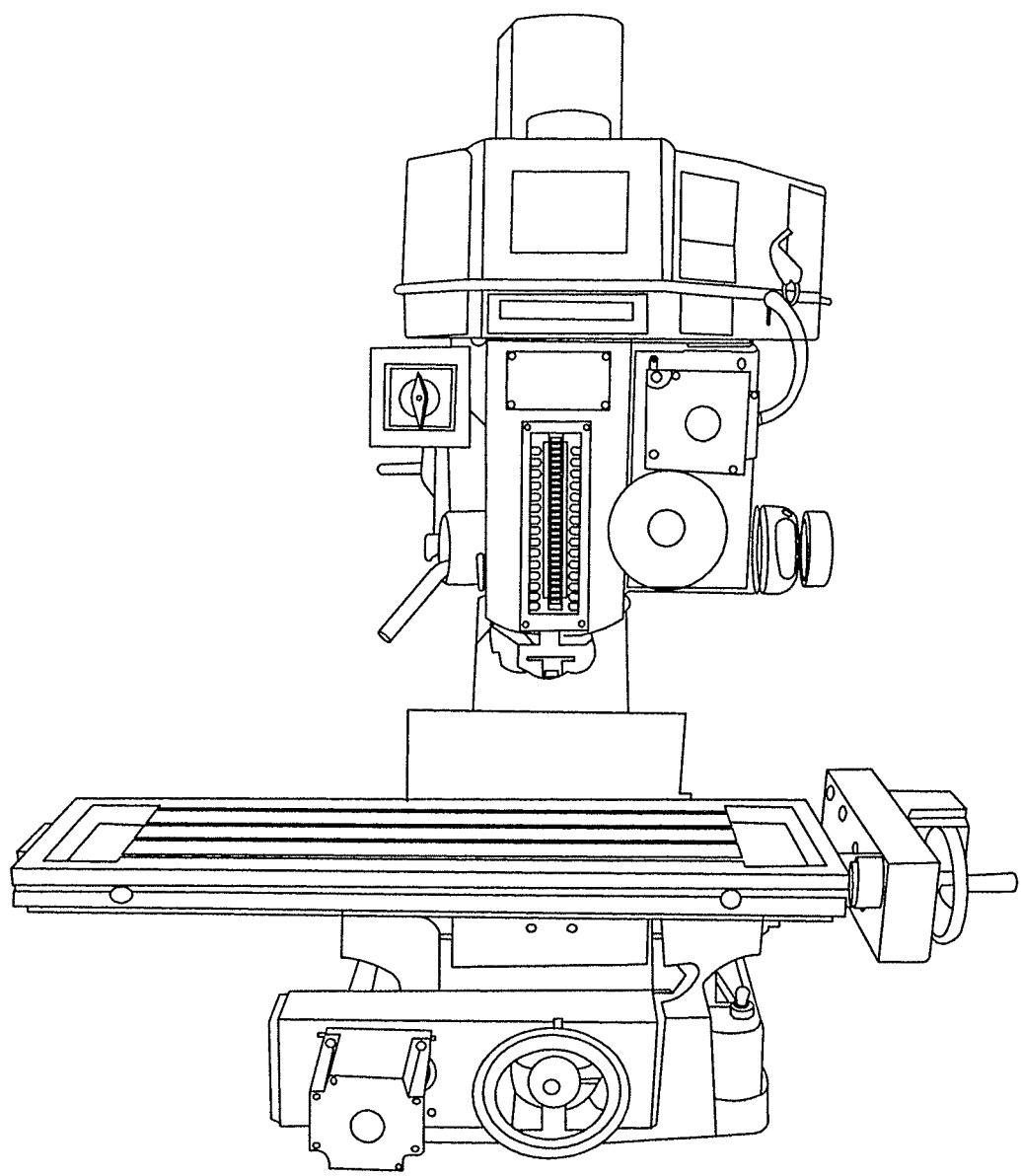
FIG. 2 illustrates a milling machine subsequent to being modified in accordance to the present disclosure.

Once a retrofit kit is installed on the machine, the retrofitted or modified milling machine allows for the quicker production of precise parts and prototypes. As described herein, and for demonstration purposes only, the Grizzly G1006 2 HP Mill/Drill (shown in FIG. 1 prior to modification and in FIG. 2 after modification) is used as an example milling machine that can be retrofitted or modified in accordance with the present disclosure.

Figure 3:
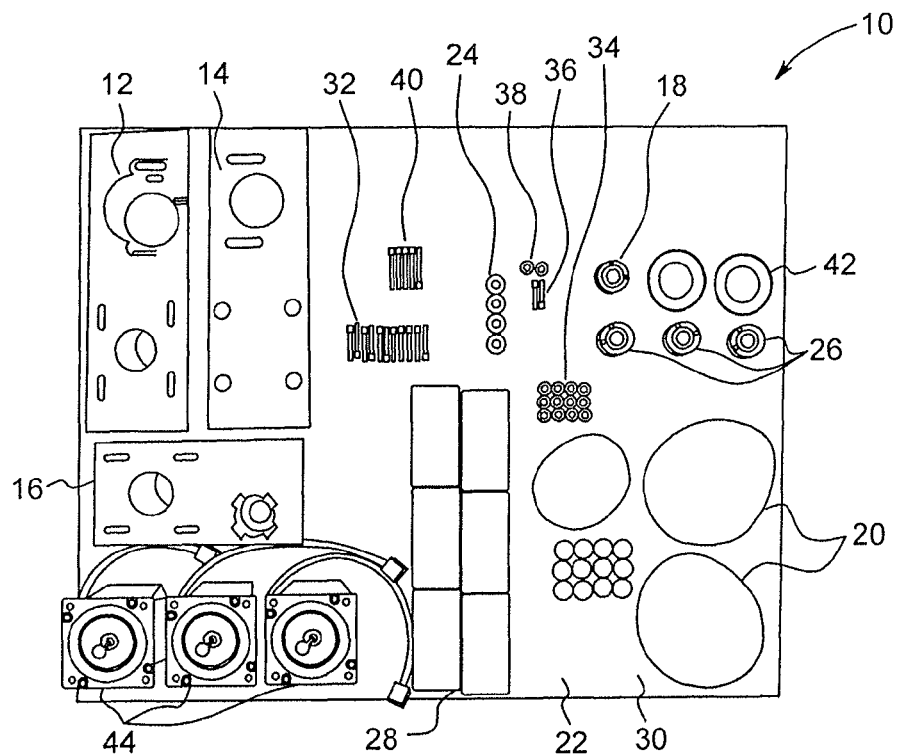
FIG. 3 shows some of the parts of a retrofit kit for the milling machine in accordance with the present disclosure.
Figure 4:
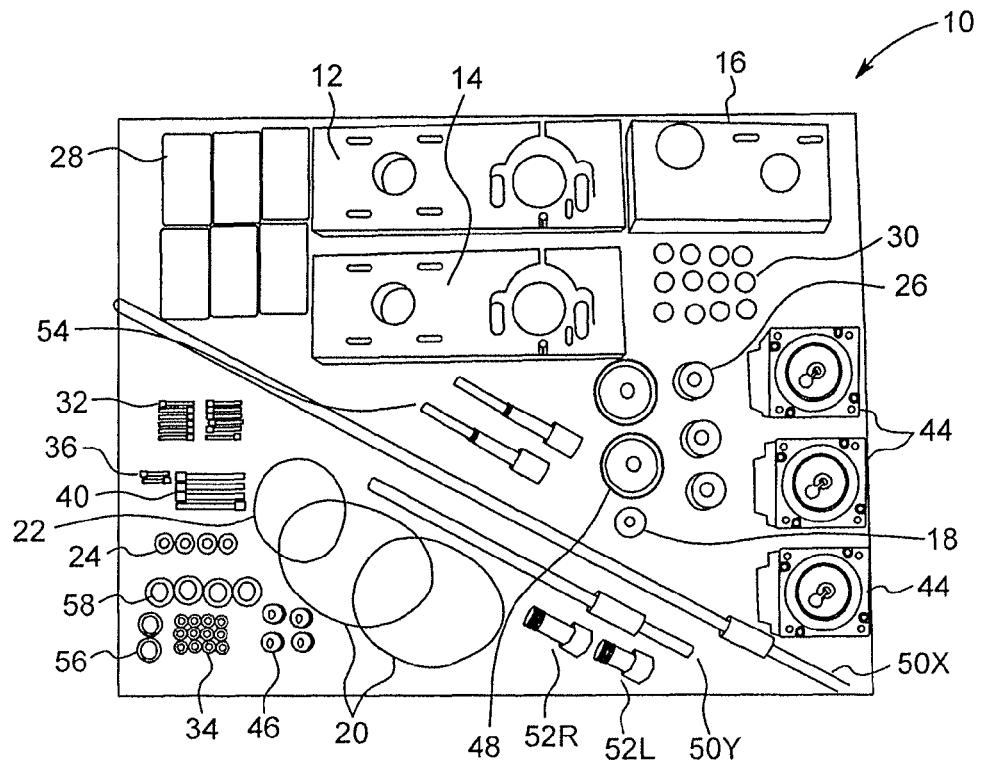
FIG. 4 shows some of the parts of a retrofit kit with ball screws for the milling machine in accordance with the present disclosure.

The detailed instructions and steps for the preferred embodiment for modifying a milling or drilling machine are set forth below. As understood by one having ordinary skill in the art, there are a number of different kits that can be incorporated into the milling machine described herein (or in other machines), and still fall within the scope of the present disclosure. FIGS. 3 and 4 show the parts of two exemplary retrofit kits 10 described herein and, in conjunction with the described steps for the modification, can be used to convert a manual milling machine to an automatic CNC milling machine. Other retrofit kits can be used to retrofit a milling or drilling machine that use some or all of these parts (or other parts) and still fall within the scope of the present disclosure.

The retrofit kit 10 contains one each of an X, Y, and Z axis unibody aluminum bracket 12, 14, 16, which house and support the stepper motors; along with a 20 tooth pulley with a 0.595 bore 18. The X and Y axes brackets 12, 14 are approximately 11.7 inches long, two inches wide and four inches high. The Z axis bracket has the same width and height and is approximately eight inches long. The kit contains three belts, two 170 XL 20 and one 120 XL 22; four steel shim washers with a 0.125" thickness, an inner diameter of $^{11}/_{32}$", and an outer diameter of $^{13}/_{16}$" 24; three 20 tooth flanged pulleys ½" bore 26; six 2×4 end caps 28, with 1 endcap containing a special cutout for top of z axis; twelve round plugs 30.

The retrofit kit 10 also contains twelve black oxide socket head cap screws 12-24 thread, 1¼" long 32; twelve serrated-flange hex locknuts 34; two M5×25 mm (or 10-24×1") socket head cap screws 36; two #10 steel washers 38; four M8×35 mm (or $^{5}/_{16}$-18×1½") thread black oxide socket head cap screws 40, two 40 tooth large bore pulleys 42; three stepper or servo control motors 44.

To show that retrofit kits 10 can be developed using different parts, FIG. 4 shows the contents of a retrofit kit 10, which contains some of the similar parts and some additional parts as described above, including one each of an X, Y, and Z axis unibody aluminum bracket 12, 14, 16; a 20 tooth pulley 18; three belts (two 170 XL 20 and one 120 XL22); four steel shim washers 24; three 20 tooth flanged pulleys 26; six end caps 28; twelve round plugs 30; twelve black oxide socket head cap screws 32; twelve serrated-flange hex locknuts 34; two M5×25 mm (or 10-24×1") socket head cap screws 36; two #10 steel washers 38 (see FIG. 3); four M8×35 mm (or $^{5}/_{16}$-18×1½") thread black oxide socket head cap screws 40; four aluminum standoffs 46; two ½" bore hand wheels (not shown); two ½" bore 40 tooth pulleys 48; two ball screws with ball-nuts attached (do not remove ball-nuts) 50X, 50Y; two ball nut holders (one right hand thread 52R and one left hand thread 52L); two ball screw shaft extensions 54; two ⅝ flexloc nuts 56; four zinc-plated steel flat washers with a 30 mm outer diameter, with a 17 mm inner diameter, and a thickness of 2.7-3.3 mm 58; and three stepper or servo control motors 44.

Further, additional parts for the stepper control system (not shown) may include a 3-axis, 8 amp/axis stepper motor driver box; along with software and manuals, such as those provided by FlashCut CNC.

Additional parts for the servo control system (not shown) may include a 3-axis, 8 amp continuous, 12 amp peak servo driver box; along with software and manuals, such as those provided by FlashCut CNC.

The installation instructions for converting or retrofitting a milling or drilling machine are detailed below with reference to the figures. The instructions apply to both sets of parts for the retrofit kits 10 (FIGS. 3 and 4), however where applicable, the different kits 10 will be referred to separately.

Many of the steps described below are understood by one having ordinary skill in the art. First, attach the 20 toothed flanged pulleys 26 to all of the motors 44 via setscrews using a $^{3}/_{32}$ Allen wrench. Typically, it is best to start with the end of the pulley 26 flush with the end of the shaft. As a warning, do not tighten the setscrew into the keyway, otherwise, the adjustment or removal of the pulley might become impossible or extremely difficult.

Next, attach the motors 44 to the brackets 12, 14, 16 with the 12-24 by 1¼" socket head cap screws 32 and matching flange nuts 34 using a $^{5}/_{32}$" Allen wrench and a $^{7}/_{16}$" socket wrench. Do not tighten the motors 44, they will need to slide in the mounting slots when the belt 20, 22 is tightened in a later step. Also notice the motor cables, install the motors 44 such that the cables are kept out of the way.

Slip the appropriate belt 20, 22 over the pulley 26 on the inside of bracket 12, 14, 16. The X and Y axes use the 170 XL belts 20 and the Z axis uses the 120 XL belt 22. Then place the top plastic end cap 28 with the corners notched on the Z axis bracket leaving the bottom open. Do not install the end caps 28 on the X and Y axes at this time. Install the four plastic plugs 30 on the X, Y and Z brackets.

Next, for the Z axis, remove the hand wheel, remove the top right screw from the Z axis indicator bezel, remove the graduated dial from the Z axis located right behind the hand wheel, and remove the two screws from the metalized cap, leaving the cap in place. Then take the Z axis bracket 16, with motor 44 attached, and slip the bracket 16 onto the shaft, making sure the belt 22 goes around the shaft. Proceed by attaching the bracket 16 to the axis via two 10-24×1" socket head cap screws 36 and utilizing two #10 steel washers 38. Next, slip the 0.595 bore 20 tooth pulley 18 onto the z axis shaft and tighten the set screw of the pulley onto the shaft via the bottom of the bracket 16, making sure the belt 22 is straight and aligned between both pulleys before tightening. Make sure the motor 44 can slide up and down and push the motor 44 up to tighten the belt 22. Tighten the four screws 32 holding the motor 44 to the bracket 16 with only an Allen wrench, due to the self-locking flange nuts. Then check belt tension and repeat these steps if the belt is not tight. There should be no slack in the belt 22, it should be firm with a slight spring. Replace the hand wheel and install on the shaft by tightening the set screw. Spin the shaft to make sure the quill moves freely up and down with proper alignment so the belt 22 is completely on the pulley 18. Adjust the position of the pulley 18 if it is not aligned properly. Finally, place an end cap 28 on the bottom of bracket 16.

For the X and Y axes of the acme kit, hammer out the spring-pins using a punch on both the X and Y axes, making sure to hammer from the small tapered end out. The spring pin is in the hand wheel coupling and has a graduated dial attached. Note the orientation of the spring-pin hole on the shaft to the coupling. Remove the hand wheel coupling from the shaft and remove the graduated dial. Attach the large bore 40 tooth pulleys 42 to the hand wheel coupling via the set screws. This pulley 42 replaces the graduated dial that was removed above. Make sure that the pulley 42 is pushed against the hand wheel coupling as far as possible.

Figure 5:
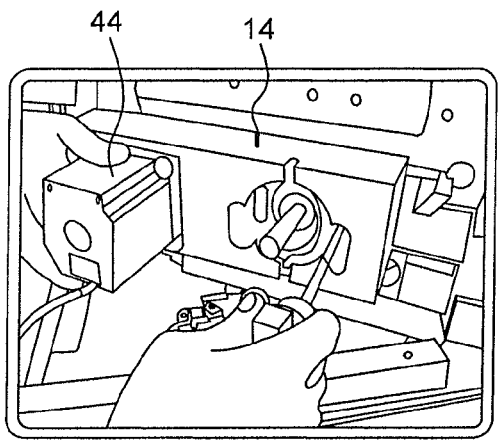
Figure 6:
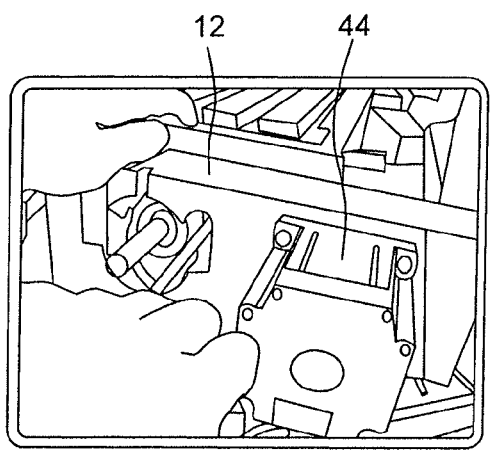

Next, remove the two screws that attach the bearing blocks to the machine (blocks that support the end of the shaft). Now, as shown in FIGS. 5 and 6, attach the bracket 12 with the M8×35 mm or ⁵⁄₁₆-18×1½" screws 40 and steel shim washers 24, placing a washer on the front side of the aluminum bracket 12. These screws 40 will replace the screws removed in the previous step. Note how the brackets 12 are oriented in FIGS. 5 and 6, where the oval holes on the front of the bracket 14 on the Y axis point down (FIG. 5), and on the X axis, point up (FIG. 6). Make sure the belt 20 is around the lead screw shaft before installing the screws 40.

Slip the 40 tooth pulley assembly and belt 20 onto the lead screw going through the large hole in the front of the bracket 12, 14, making sure that the belt 20 is not pinched between any surfaces before proceeding. Next, locate the large spring-pin hole on the coupling and align it with the shaft to point vertically, being careful to make sure the orientation is correct, as an incorrect orientation may make removing the coupling difficult or impossible. Then, look through the spring pin hole to ensure alignment. The lead screw shaft might need to be spun in order to align the holes and to ensure that it is all the way out of the bearing block. Hammer the spring pin back into place, which should occur with relative ease. If it is taking more effort to hammer the pin in than hammering it out, the holes are probably not aligned.

Figure 7:
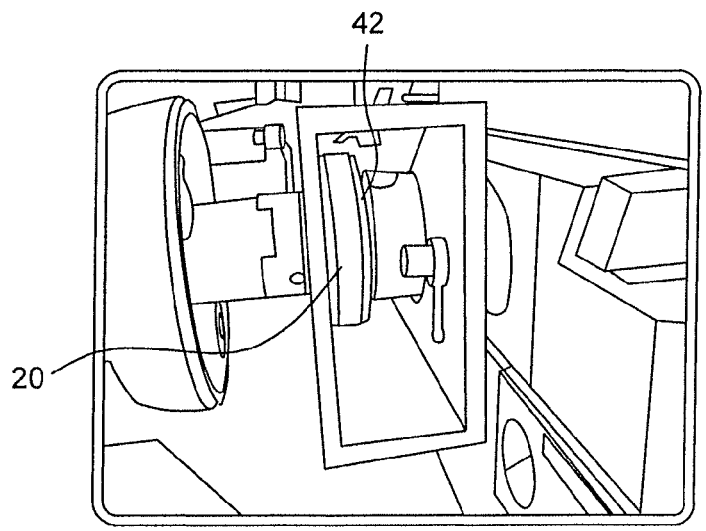

As shown in FIG. 7, tighten the belt 20 and tighten the four motor screws. Replace the hand wheels that originally came with the machine. Spin the shaft to make sure the axes move freely with proper alignment so the belt 20 is completely on the pulley 42 as shown in FIG. 7. Adjust position of pulley 42 if not aligned properly. Finally, place the end caps 28 on the ends of the two brackets 12, 14.

The next steps or instructions for the retrofit kit, and in particular, for the ball screw kit X and Y are detailed below with reference to the figures.

Figure 8:
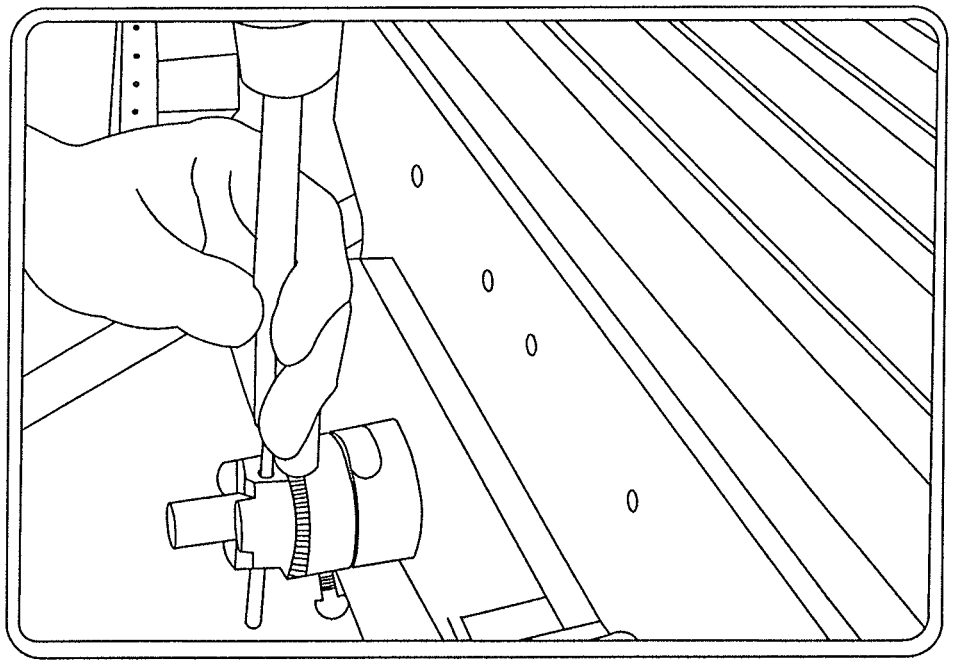
Figure 9:
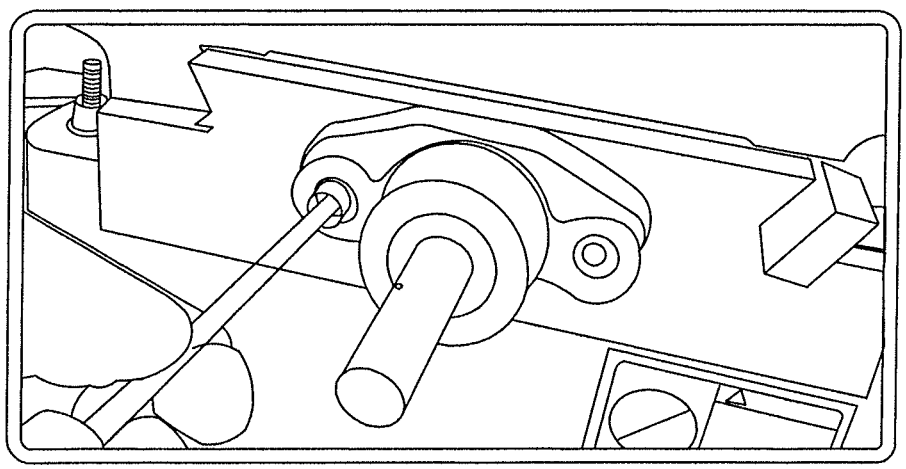

First, and as similarly described above and as shown in FIGS. 8 and 9, hammer out the spring-pins using a punch on both the X and Y axes (FIG. 8), making sure to hammer from the small tapered end out. The spring pin is in the hand wheel coupling and has a graduated dial attached. Note the orientation of spring-pin hole on the shaft to the coupling. Remove the hand wheel coupling and graduated dial from the shaft. Remove the two screws that attach the X and Y bearing blocks to the machine (FIG. 9). These are the blocks that support the end of the shaft. Remove both bearing blocks.

As shown in FIGS. 10 through 13, remove the X axis gib (FIG. 10), and slide the X axis table off or over to gain access to the acme nut (FIG. 11). The X axis table is very heavy and it may take two people to move it. One aspect of the present disclosure is that the table does not have to be removed completely, only moved over, to continue with the retrofit of the milling machine.

Figure 13:
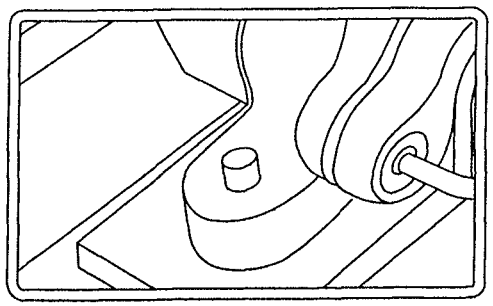

Next, remove the X axis lead screw by unscrewing it from the acme nut. Thread the X axis ball nut adapter 52R (with the right hand threads) on the acme nut, the longer ball nut adapter 52R, with the right handed thread, is used for the X axis (FIG. 12). Tighten using a wrench. Then tighten the set screw on the acme nut to lock in the ball nut adapter (FIG. 13).

Figure 14:
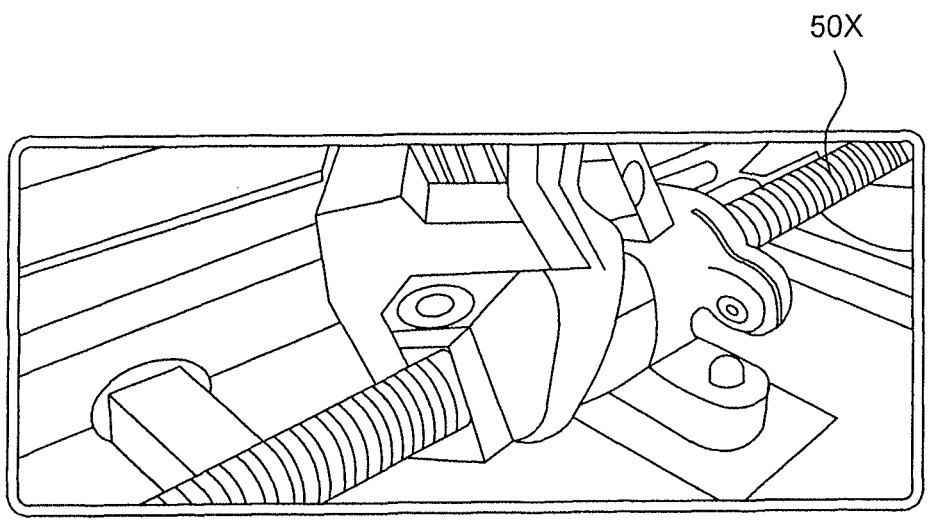

As shown in FIG. 14, thread the X axis ball screw and ball nut assembly 50X onto the left side of the X axis ball nut adapter 52R and firmly tighten using a wrench. When handling the ball screw, be careful not to unscrew the ball nut all the way off of the ball screw, otherwise the ball bearings will fall out.

Figure 15:
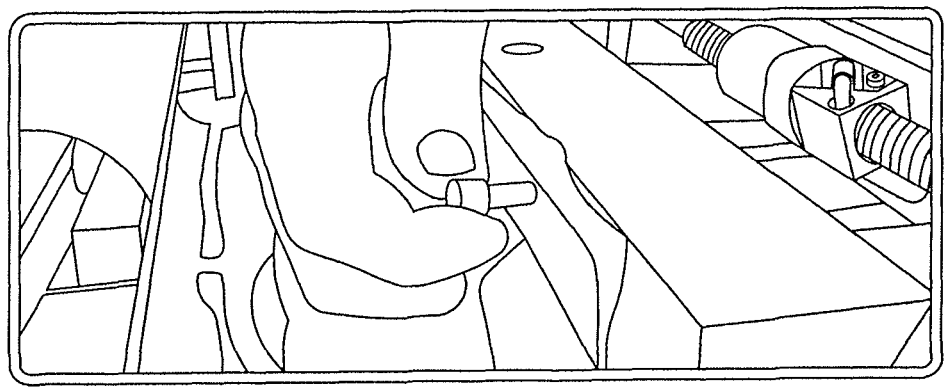
Figure 16:
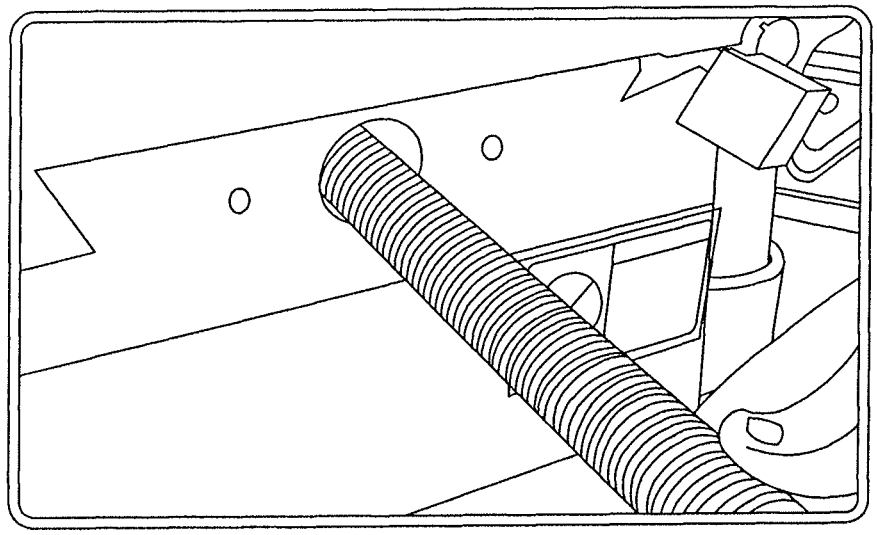
Figure 17:
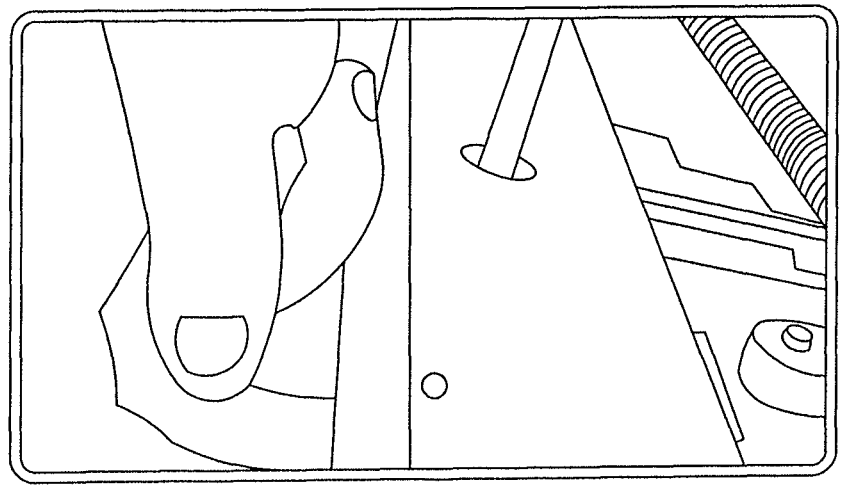

As shown in FIGS. 15 through 17, slide the table saddle assembly to the front edge of the machine, away from spindle column. Remove the rubber chip guard from the rear of the saddle by removing the two screws, and remove the Y axis acme screw (FIG. 16). Remove the Y axis acme nut by removing the screw from the top of the saddle (FIG. 17).

Figure 18:
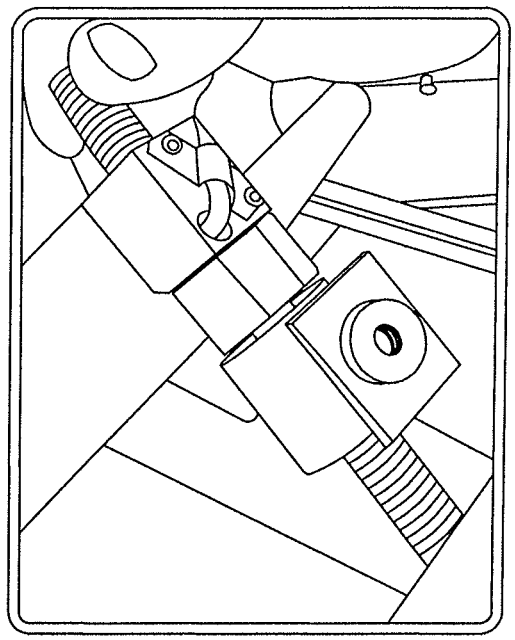

Next, as shown in FIG. 18, tightly connect the Y axis ball nut 50Y, left-handed thread ball nut adapter 52L and acme nut to each other using two wrenches as was done with the X axis assembly. Tighten the set screw, which will securely keep the ball nut adapter 52L from loosening. Carefully place the assembly through the base and out of the front hole of the machine.

Figure 19:
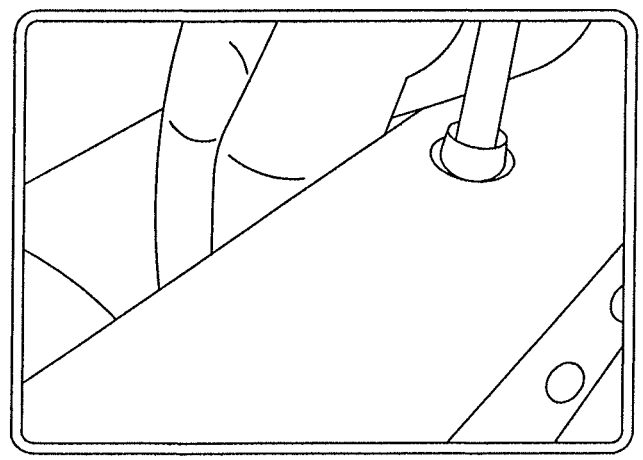

Then, using the screw from the top of the saddle, as shown in FIG. 19, screw the acme nut back into place, making sure the lead screw is well centered in the front hole, and tighten firmly.

Figure 20:
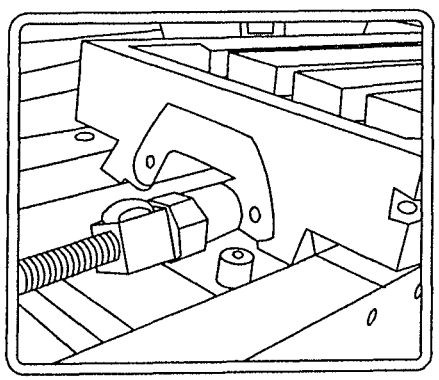
Figure 21:
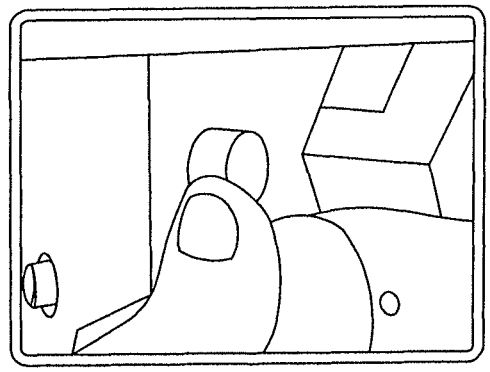

As shown in FIGS. 20 and 21, slide the X axis table back into place (or place back on the machine if it was removed) (FIG. 20) and move both the X and Y axes to a location where the ends of the ball screws 50X and 50Y are accessible and sticking out at least 2". Replace and adjust the gib so the table slides freely with no play (FIG. 21).

Figure 22:
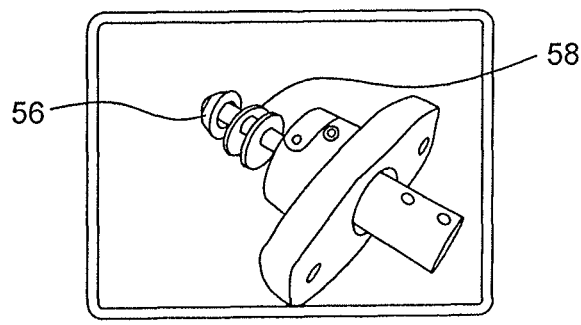

Next, as shown in FIG. 22, using two wrenches, assemble the X and Y axes bearing block assemblies using the ball screw extension shafts 54, two zinc plated steel flat washers 58, and the ⅝" flex-lock nut 56. Since this is a bearing assembly, there should be no play; it should be snug, but the shaft should be free to rotate. Do not over tighten. Next, screw in the two set screws so that they protrude into the inner diameter of the ball screw extension shaft 54 by about 1/16".

Then, using the set screws as temporary threads, carefully screw the ball screws 50X and 50Y into the ball screw extension shafts 54 until the ball screws 50X and 50Y bottom out. Tighten the set screws extra firm and inspect to make sure there is no play in the joint. The assembly should be snug without linear play in the bearing block. If the assembly is too tight it will be very difficult to spin the shaft and may result in bearing damage. Some resistance is acceptable, however; if it is too loose there will be backlash or play in the block, resulting in poor cutting performance. Thread lock may be used to ensure a positive connection.

While holding the bearing block in the correct orientation, carefully turn the ball screw extension shafts 54 until the bearing block is in contact with the casting or table. Temporarily secure using the original screws that came with the machine. If the bearing block does not line up with the screw, loosen the acme nut via screw on the top of the saddle, adjust the position of the bearing block and tighten the screw again.

Figure 23A:
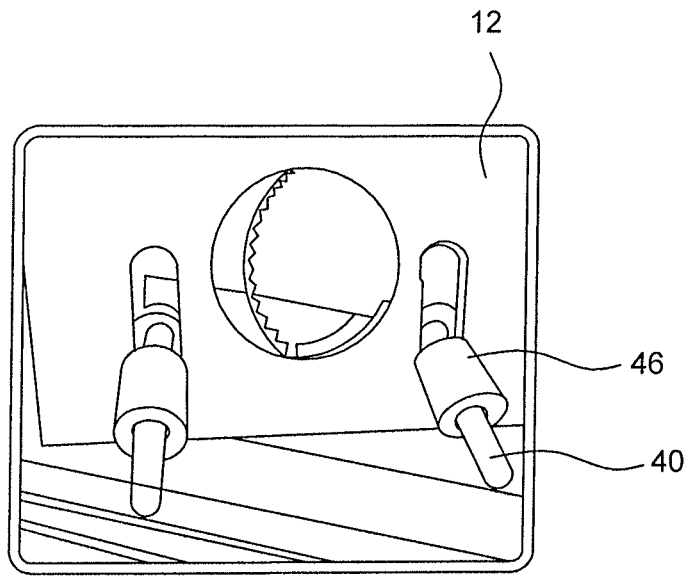
Figure 23B:
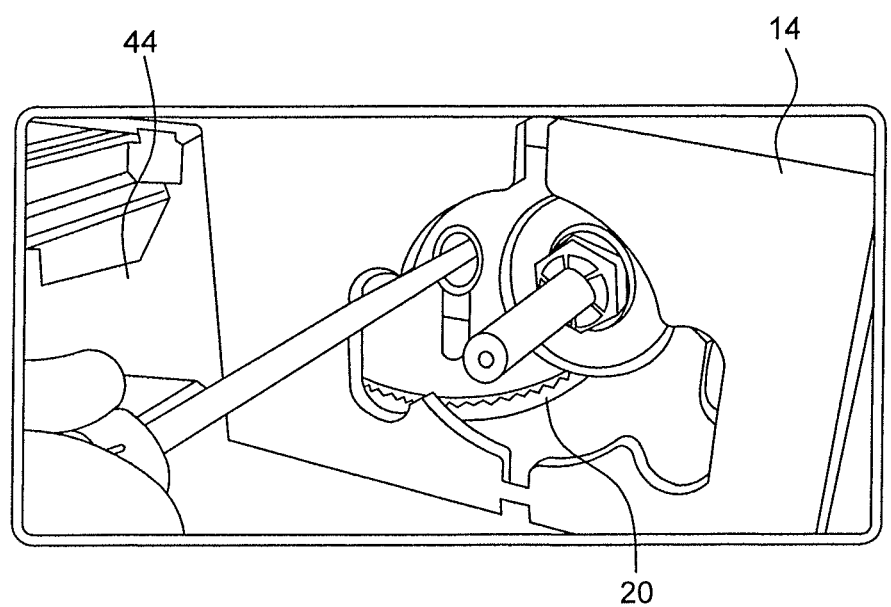

As shown in FIGS. 23A and 23B, attach the bracket with M8×50 mm or 5/16-18×2½" screws 40 which will replace the original screws in the bearing block. Start by placing a steel shim washer 24 on a screw 40 and feeding the screw through the bracket 12 mounting hole. Then, slide the aluminum standoff 46 onto the screw 40 on the other side of the bracket 12 (FIG. 23A). Next, loosely tighten the screw 40 through the bearing block into the machine. Repeat for the other mounting screw 40. Finally, tighten the entire assembly into place (FIG. 23B). Note how the bracket 12 is oriented; the motor 44 is on the left of the front Y bracket 14 and on the right of the X table bracket 12.

Next, slip the 40 tooth pulley 48 and belt 20 onto the lead screw through the large hole in the front of the brackets 12, 14. Make sure the belt 20 is not pinched between any surfaces before proceeding. The belt 20 should be completely on the toothed pulley 48. Tighten the set screw against the flat on the ball screw extension shaft 54.

Next, tighten the belt 20 and tighten the four motor screws 32. Place one of the axis handles with the ½" bore on the ball screw extension shaft 54 and tighten the set screw to the flat of the shaft. Rotate the shaft to make sure the axis moves freely with proper alignment so the belt 20 is completely on the pulley 48. Adjust the position of the 40 tooth pulley 48 or the motor pulley 26 if not aligned properly. Install end caps 28 on both ends of the brackets 12, 14, and replace the rubber chip guard on the back of the saddle.

Installation of the X axis bearing block assembly and motor housing is the same as that of the Y axis bearing block and the same instructions can be used to install the X axis assembly. Once the X and Y axes assemblies have been completed, the retrofit is complete.

After installation of the retrofit kits 10, the modified milling machine can be connected to a controller and the software can be installed and/or set up. As an example, the FlashCut CNC Hardware Manuals for the Pro-Series Servo or Stepper provides connecting instructions, the contents of which can be found at www.flashcutcnc.com, which is incorporated by reference herein.

Figure 24:
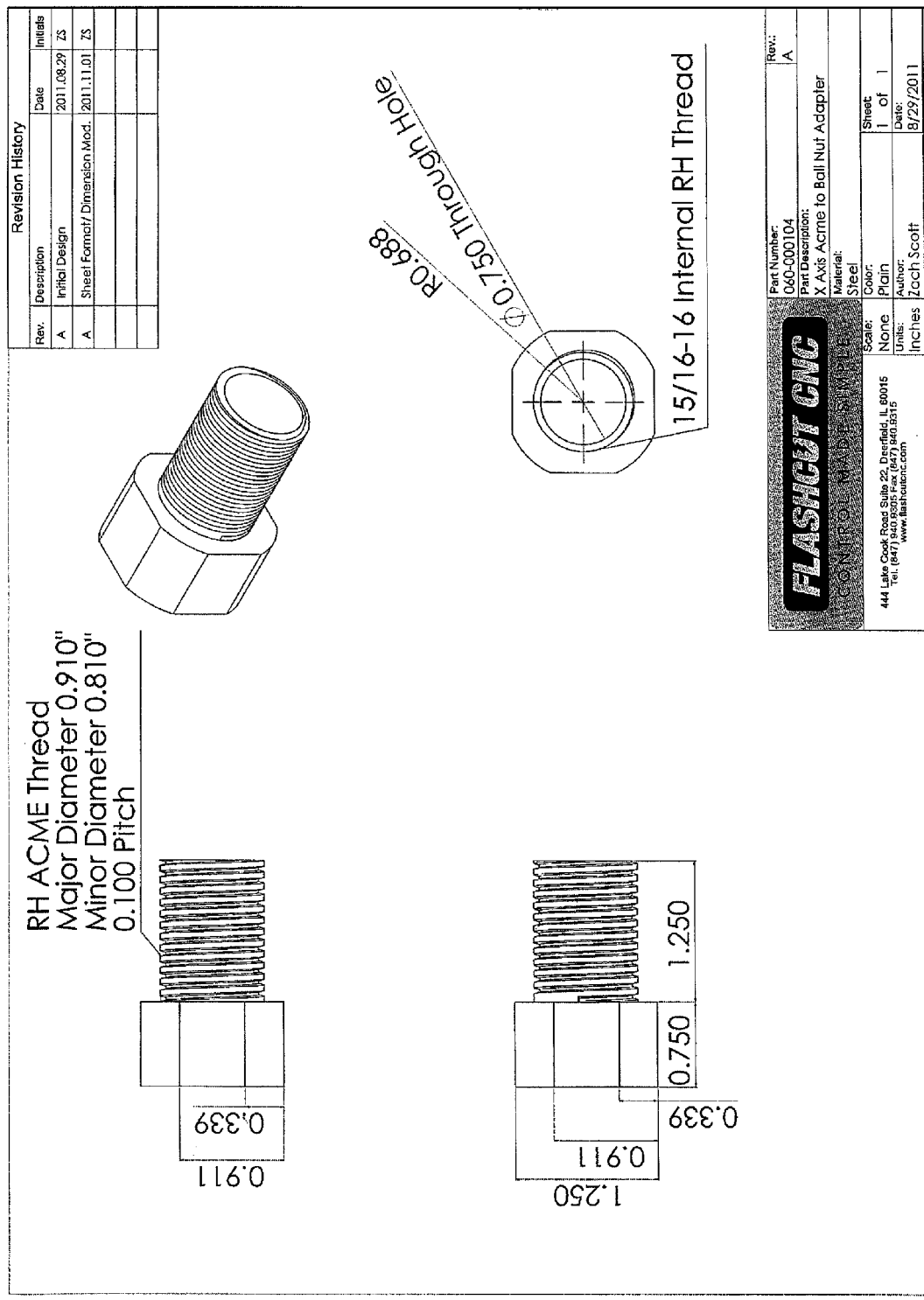
FIG. 24 illustrates the dimensions of the X axis acme to ball nut adapter for the milling machine retrofit kit in accordance with the present disclosure.

FIG. 24 illustrates an exemplary X axis acme to ball nut adapter 52R for the milling machine retrofit kit 10 as described herein. Of course, other size ball nut adapters 52R can be used. The dimensions of the exemplary adapter 52R are 1.25"×2", with a right hand acme thread of major diameter 0.910" and minor diameter 0.810" and a 0.100" pitch. The dimensions of the left hand acme thread adapter 52L are similar except for a length of 1.5", and are for the Grizzly product referred to herein. These dimensions can be modified to fit any milling or turning machine, or any other machine that incorporates lead screws of varying pitch, thread geometry, and diameter, while still falling within the scope of the present disclosure.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A process for modifying a manual milling machine which incorporates at least one acme screw to an automatic milling machine which incorporates at least one ball screw comprising the step of placing an adapter on said at least one ball screw to create at least one ball screw and adapter combination, and placing said at least one ball screw and adapter combination onto the original acme nut without removing the original acme nut from the machine, thereby modifying the manual milling machine without replacing an original acme nut from the manual milling machine, and eliminating the need to produce a special ball nut that ensures proper alignment.

2. The process for modifying a manual milling machine in claim 1, in which said adapter is screwed into place on said at least one ball screw.

3. The process for modifying a manual milling machine in claim 1, in which said at least one ball screw and adapter combination is screwed into place onto the original acme nut.

4. The process for modifying a manual milling machine in claim 1, wherein said at least one ball screw comprises two ball screws, and an adapter is placed on each ball screw.

5. The process for modifying a manual milling machine in claim 1, in which after modifying said manual milling machine, the milling machine can be driven through a computer-based control system.

6. The process for modifying a manual milling machine in claim 1, in which after said modification, said manual milling machine will be a CNC milling machine.

7. The process for modifying a manual milling machine in claim 6, in which the CNC milling machine is connected to a controller for controlling the CNC milling machine.

* * * * *